Figure 1:
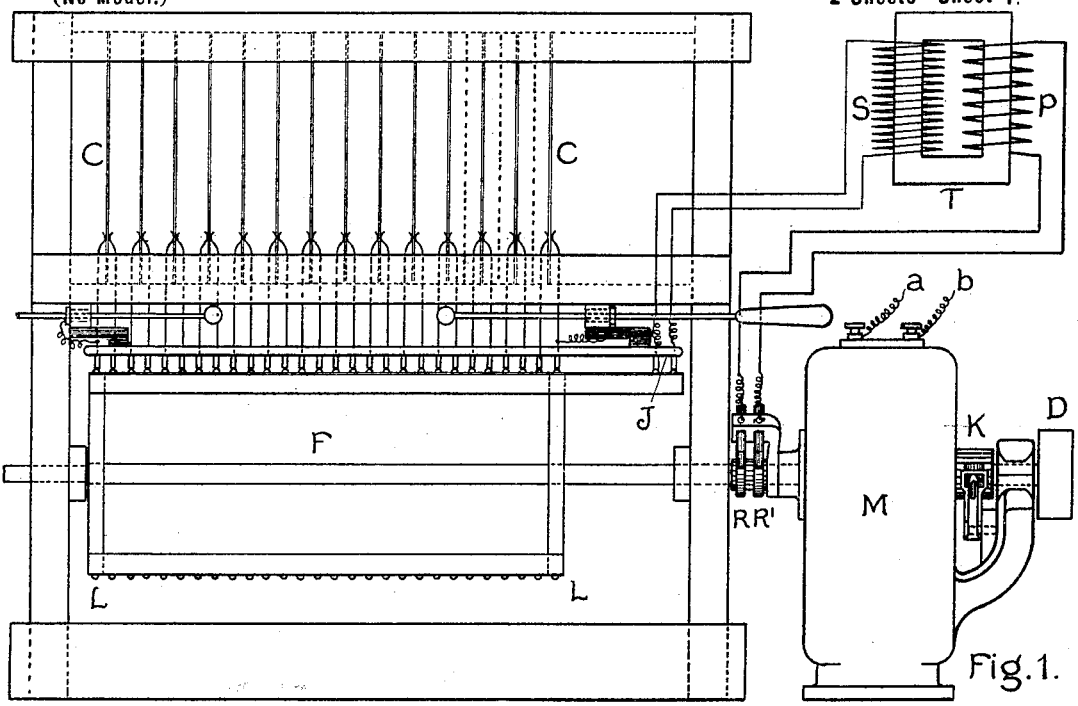

No. 645,675.  
Patented Mar. 20, 1900.  
E. THOMSON.  
HIGH POTENTIAL APPARATUS.  
(Application filed Dec. 26, 1899.)  
(No Model.)  
2 Sheets—Sheet 1.

WITNESSES  
Henry O. Westendarp.  
Dugald McKillop.

INVENTOR  
Elihu Thomson,  
by Albert G. Davis  
Atty.

No. 645,675. Patented Mar. 20, 1900.
E. THOMSON.
HIGH POTENTIAL APPARATUS.
(Application filed Dec. 26, 1899.)

(No Model.) 2 Sheets—Sheet 2.

WITNESSES
Henry O. Westendarp.
Dugald McKillop.

INVENTOR
Elihu Thomson.
by Albert G. Davis
Atty.

THE NORRIS PETERS CO., PHOTO-LITHO., WASHINGTON, D. C.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

HIGH-POTENTIAL APPARATUS.

SPECIFICATION forming part of Letters Patent No. 645,675, dated March 20, 1900.

Application filed December 26, 1899. Serial No. 741,541. (No model.)

*To all whom it may concern:*

Be it known that I, ELIHU THOMSON, a citizen of the United States, residing at Swampscott, county of Essex, State of Massachusetts, have invented certain new and useful Improvements in High-Potential Apparatus, (Case No. 1,226,) of which the following is a specification.

My invention relates to apparatus for generating electricity of high potential, the object being to produce from galvanic or dynamic electricity such effects as are usually created by frictional or induction machines.

In carrying out my invention I provide a source of intermittent or pulsatory electric currents adapted to be connected with a condenser, so as to charge the several plates or surfaces of the condenser in parallel and discharge them in series or into a reservoir or jar storing the high-potential electricity. The charging and discharging apparatus is mounted so as to make the connection with the condenser-plates in parallel simultaneous with the pulsations of dynamic current issuing from the source and the series connection dissimultaneous with the pulsatory dynamic impulses and after the source has been cut off from the condensers. I preferably operate with pulsatory dynamic currents of sufficiently-high potential to permit a charge in parallel of the condenser-surfaces without metallic contact of the coöperating terminals, thereby permitting the charge and discharge of the condenser to be effected through a medium offering but little mechanical friction to motion. I prefer to accomplish this connection through air by rotating the connecting device, so as to produce a charge of the condenser synchronous with the pulsatory dynamic impulses. By an organization of this kind dynamic currents may be transmuted into "static" charges of extraordinary potential capable of simulating, and, indeed, of accurately reproducing in all respects, the phenomena of static electricity as generated by frictional or induction machines.

In order to simplify and cheapen the apparatus, I prefer to employ as a source of dynamic current an alternating-current generator and a step-up transformer the two windings of which have such a ratio of turns as to build up the potential delivered by the alternating generator to a point at least capable of bridging an air or other insulating fluid gap between the condenser and transformer terminals. The connecting device is preferably operated by the same power which operates the alternating-current generator and may be directly connected with the armature-shaft or be geared thereto, so as to effect the connection with the condensers once for every current wave or alternation or once for every second, third, or other desired number of wave. A rotary device which effects the connections of the generator with the condenser and of the several plates of the condenser *inter se* is provided with two independent groups of contacts located in different circumferential angles, one set being adapted to connect the condenser-terminals in parallel for charge and the other set in series or cascade for discharge. The condenser-terminals when connected in cascade may deliver a charge through an air-gap or by contact to a prime conductor or Leyden jar. The rotating contacts are so arranged, and especially where the current delivered by the dynamic source is alternating, that parallel connection with the condenser-surfaces is made only at or near the peak of a wave, thereby preventing any back discharge from the condenser-surface during the period of charge in a manner similar to the Lemp selector, as described in an application of Hermann Lemp, filed December 1, 1897.

The novel features of my invention will be hereinafter more fully described and will be definitely indicated in the claims appended to this specification.

Figures 2, 3:
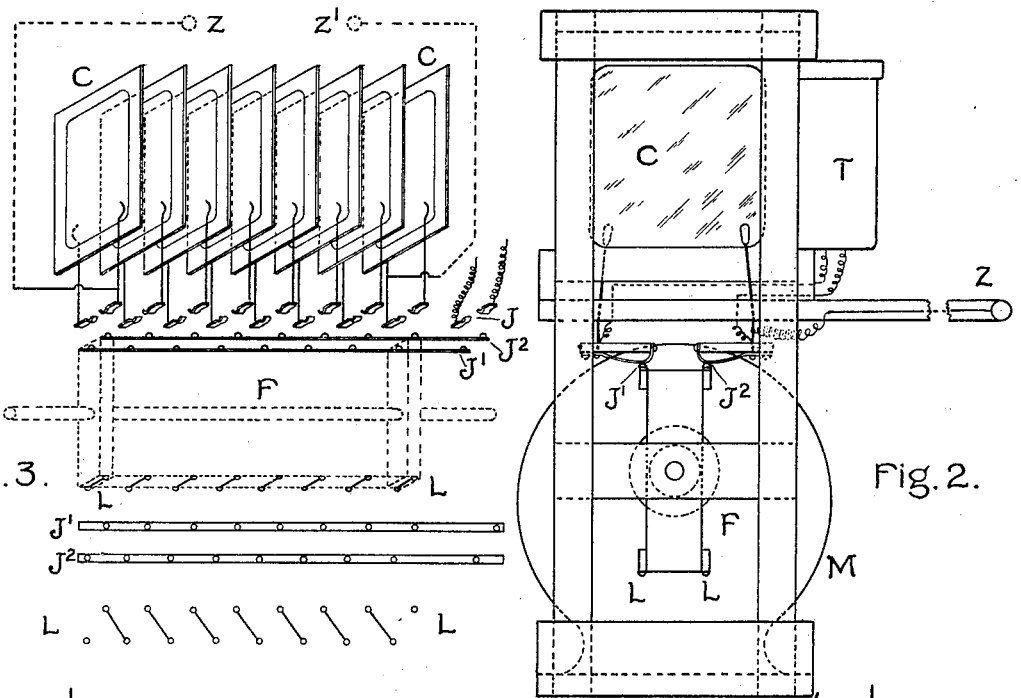
Figure 4:
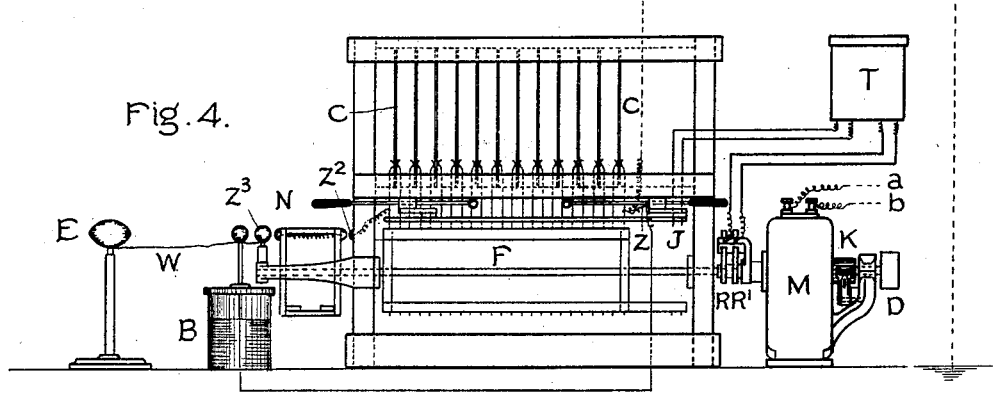
Figures 5, 6:
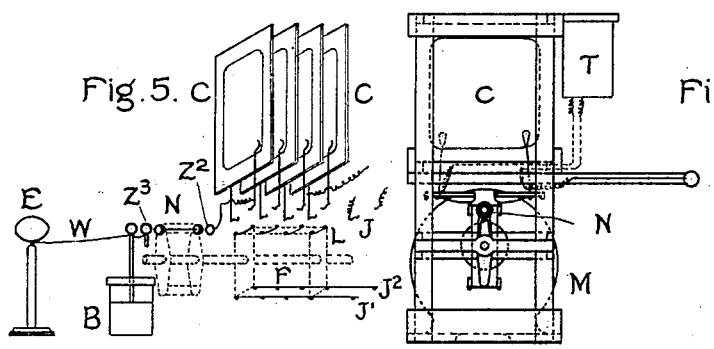

In the accompanying drawings, which illustrate the invention, Figure 1 is a side elevation of an apparatus embodying my improvements. Fig. 2 is an end view thereof. Fig. 3 is a view of details of the operating parts of the selector and condenser. Fig. 4 is a similar view to Fig. 1, showing the arrangement for storing the static charge developed by the apparatus. Fig. 5 is a view in perspective of part of the condenser and static-storage apparatus. Fig. 6 is an end view from the left of the device shown in Figs. 4 and 5. Figs.

Figures 9, 10, 11:
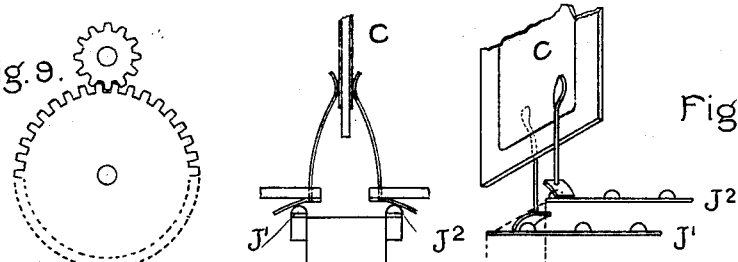

7 and 8 are diagrams showing the result of the selector in delivering current impulses to the condenser. Fig. 9 is a detail of gearing indicative of the manner of cutting down the delivery of charging impulses, and Figs. 10 and 11 are detail views showing the connection of the selector with the condenser-plates.

Referring first to Fig. 1, M represents a source of dynamic current. I prefer for reasons of convenience in using the apparatus to employ for this purpose a rotary converter in which direct current is delivered to one set of terminals, as $a\ b$, and alternating current is taken from collector-rings R R'. As it is unnecessary to generate in this part of the apparatus current of extraordinary potential, a common armature-winding may be employed to receive from the terminals $a\ b$ direct current and deliver to the terminals R R' alternating current. It will of course, however, be obvious that independent armatures or windings may be employed, one taking the direct current from the commutator K and the other delivering alternating current to the collector-rings R R', or that a synchronous machine may be employed for conversion or a self-exciting alternating generator driven by a pulley, as D.

With regard to the source, a wide range of selection is possible, as will be fully obvious from what hereinafter follows, it being borne in mind that the cardinal requirement is merely to provide a source of pulsatory currents and a condenser-charging device. The alternating impulses developed by the generator M are delivered to the primary of a transformer T, the two windings P and S of which, representing, respectively, the primary and secondary, are wound in a high ratio, which may be varied according to the potential available from the generator M and that it is desired to impose on the condenser. In the case of one hundred volts delivered to machine M the transforming ratio may be as one to one hundred and fifty, giving a maximum voltage at the secondary terminals S of fifteen thousand volts. The transformer under the best conditions should be designed for the frequency delivered by the alternating source. In order to perfectly insulate it, I immerse it in oil in a manner now commonly employed when dealing with currents of very high potential. The terminals of the secondary winding are led to insulated electrodes mounted upon a fixed frame and separated a sufficient distance to avoid short-circuiting discharges. These are indicated at J. Mounted upon a prolongation 2 of the armature-shaft of the generator is a frame F, provided at circumferentially-separated points, or at least at points so located as to follow at definite intervals in the path of rotation of the frame, with contact devices for a plurality of condenser-surfaces C. These surfaces may be conveniently formed by mounting on opposite sides of glass plates fixed a suitable distance apart in the frame and well-insulated tin-foil surfaces. The two foils of each plate, on opposite sides thereof, connect with metallic conductors leading to fixed terminals similar to those indicated at J in Fig. 3. These terminals are well insulated from one another on a supporting-frame and lie in the path of the connector terminals or contacts carried by the frame F. One group of these contacts, that shown at the top in Fig. 3, are positioned to coöperate with the terminals of the several condenser-plates and all connect in multiple with the terminals $J'$ $J^2$, so that when the frame F occupies the position indicated in Fig. 3 the current delivered from the transformer-terminals at J to the terminals $J'$ $J^2$ across the air-gap is transmitted, so as to deliver to each condenser-plate, on opposite sides thereof, a positive and negative charge. On the diametrically-opposite portion of the frame F is mounted another group of contacts in an alinement inclined to the alinement of the upper pairs of contacts, as indicated at the bottom part of Fig. 3 and at L L in the lower detached detail, which when the frame is turned through an angle of one hundred and eighty degrees connects the several condenser-plates in series relation and by which the opposing foils of each intermediate pair of condenser-plates are connected together in a manner similar to the connections of a primary galvanic battery. The terminal foil of the series of condensers leads to a discharge-terminal Z and the terminal foil at the other end of the series to a corresponding opposite terminal Z', the inclined strips L L connecting the confronting foils of the intermediate plates in regular order, plus to minus, plus to minus, &c. In lieu of delivering the condenser-charge when connected in cascade by the selector F directly to the discharge-terminals Z Z' the charge may be stored and the effects exalted by employing a rotating discharger, as indicated at N in Fig. 4, which at moments when the condenser is connected in cascade delivers a charge from a fixed terminal contact $Z^2$, leading from one end of the condenser series to an insulated conductor, such as a metal ball $Z^3$, such connection occurring only at times when the frame F has brought the condenser into discharging or cascade relation. From the ball $Z^3$ the charge may be delivered to the inner coating of a Leyden jar B, the outer coating of which may be connected with the opposite condenser-terminal or may be grounded, as is often done with one terminal of a static machine. The condenser jar or battery B thus receives a charge which is built up or added to to the limit of the apparatus by the continued revolution of the frame F and connector N, moving in synchronism therewith. The Leyden jar or battery may be connected with an insulated conductor through a high resistance E, such as a string rubbed with graphite or a piece of wood soaked in a weak salt solution, (indicated at W.) Through this connection there is a flow to the insulated conductor E, bringing its potential to that of the inner coat of the jar or battery B with respect to earth, and a stream of sparks representing a discharge of but small capacity can be obtained from the insulated conductor E, as from the prime conductor of a static machine used without condensers.

The potential of the static discharge obviously depends upon the number of condenser-plates employed and upon the initial potential imposed by the dynamic-current generator. In the case I have assumed of a transformer delivering fifteen thousand volts at its terminals, if a condenser of fourteen plates, as indicated in the drawings, be employed the ultimate potential would be about two hundred and ten thousand volts. With fifty plates, similarly arranged, the potential would be seven hundred and fifty thousand volts, approximately.

Figure 7:
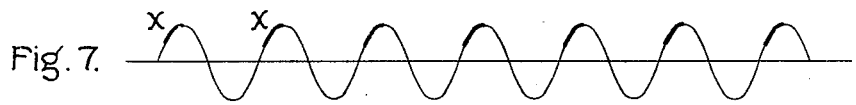
Figure 8:
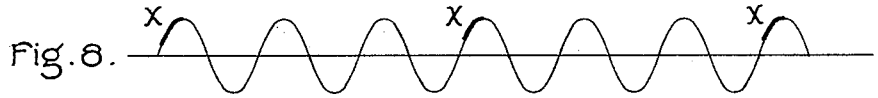

The diagrams, Figs. 7 and 8, show the operation of the selector in delivering impulses to the condenser. In Fig. 7 connection is made between the source of dynamic current and the condenser by the range of contacts $J'$ $J^2$ near the peak of the wave, so that the condenser is disconnected before the potential of the wave decreases and a tendency to discharge occurs. This is shown by a heavy black line X spanning a portion of each wave. Only impulses of like sign, however, should be delivered to the condenser. Thus only the peak of a positive or negative range of impulses is delivered, as indicated in the diagram. Obviously these impulses may be delivered once for each wave or once only for a series of waves—a result which may be easily effected by gearing the selector-frame down so as to make a complete revolution for a determinate number of waves delivered by the alternating-current generator—as, for example, in Fig. 9, where the gearing is so arranged that the frame makes one revolution for three revolutions of the drive-shaft, and three complete waves will therefore intervene between the delivery of successive charging impulses to the condenser.

Where a multipolar generator is employed, a suitable distribution of the contacts on the selector-frame with reference to angular displacement must be made, which will be sufficiently clear to those skilled in electrical apparatus to require no further description.

While I have described and prefer to employ an alternating-current source and for reasons of cheapness and effectiveness a source of the kind described hereinabove at length, it is not absolutely essential to a successful conversion of dynamic or galvanic current into static electricity that alternating current should be employed, as periodic or pulsatory currents of any suitable character might be employed, the main point being that electrical energy at high tension, preferably alternating or pulsating, shall be delivered to the condenser-plates when connected in parallel and disconnected therefrom while the plates are permitted to discharge in cascade.

What I claim as new, and desire to secure by Letters Patent of the United States, is—

1. Means for generating high-potential electricity, comprising means for delivering intermittent electric current across a gap in a fluid non-conducting medium to a condenser connected in parallel, and means for dissimultaneously connecting the condenser-plates in series.

2. Means for generating high-potential electricity, comprising a source of pulsating electrical current, a continuously-rotating device, a plurality of condenser-plates, contacts carried by the rotating device for connecting the condenser-plates in parallel relation to the source of current, angularly-displaced contacts for dissimultaneously connecting the condenser-plates in series, and collecting-terminals for the points of maximum potential in the condenser.

3. Apparatus for generating high-potential electricity, comprising a source of current, a condenser, means for delivering low-frequency intermittent impulses of like sign to the condenser-surfaces in parallel from the source, and connectors for coupling the condenser-surfaces between the moments of current delivery in series.

4. Apparatus for generating high-potential electricity, comprising a source of current, a condenser, means for delivering intermittent impulses of like sign to the condenser-surfaces in parallel, a fluid-insulator in the gap between the points of delivery, and connectors for dissimultaneously coupling the condenser-surfaces in series.

5. Apparatus for generating high-potential electricity, comprising a source of current, a condenser, means for delivering intermittent impulses of like sign to the condenser-surfaces in parallel, connectors for dissimultaneously connecting the surfaces in series, and an air-gap between the points of commutation.

6. Apparatus for generating high-potential electricity, comprising a source of current, a condenser, a commutator for alternately charging the condenser in parallel from the source, and discharging it in series, a reservoir for high-potential discharges, a discharging-conductor, and a high-resistance connection between the reservoir and the discharger.

7. Apparatus for generating high-potential electricity, comprising a source of alternating current, a condenser, a selector for leading determinate parts of the waves to the condenser in parallel, and connections for discharging the condenser in series.

8. Apparatus for generating high-potential electricity, comprising a source of alternating current, a condenser, a selector for connecting the crests of like alternations successively with the condenser in parallel, and connections for discharging the condenser in series.

9. Apparatus for transmuting dynamic electrical energy into static, comprising a source of pulsating current, a step-up transformer, a condenser, means for leading impulses of like sign to the condenser in parallel, and connections for discharging the condenser in series.

10. Apparatus for transmuting dynamic electric energy into static, comprising a source of pulsating current, a step-up transformer, a condenser, a selector for leading increasing electromotive forces of like sign from the transformer to the condenser in parallel, and connections for discharging the condenser in series.

11. Apparatus for transmuting dynamic electric energy into static, comprising an alternating-current source, a step-up transformer, a condenser, a selector for leading increasing electromotive forces of like sign from the transformer to the condenser in parallel, and connections for discharging the condenser in series.

12. Apparatus for transmuting dynamic electric energy into static, comprising a source of pulsating current, a condenser, a commutator for alternately coupling the condenser with the source in parallel and discharging it in series through an air-gap, and a static reservoir to receive the discharge.

13. Apparatus for transmuting dynamic electrical energy into static, comprising a source of alternating current, a step-up transformer, a selector for leading waves of like sign to a condenser in parallel, connections for discharging the condenser in series, an air-gap through which the connection is maintained, and a reservoir to receive the static charge.

14. Apparatus for transmuting dynamic electric energy into static, comprising a source of pulsating electric current of high potential, a condenser, a commutator for alternately connecting the condenser-surfaces in parallel with the source and in series relation, a discharger moving synchronously with the commutator, and a static reservoir connected with the condenser by the discharger during the series connection.

In witness whereof I have hereunto set my hand this 22d day of December, 1899.

ELIHU THOMSON.

Witnesses:
DUGALD MCKILLOP,
HENRY O. WESTENDARP.